A. J. B. JAUBERT.
VALVE MECHANISM FOR EXPLOSION MOTORS.
APPLICATION FILED AUG. 16, 1912.
1,120,149.
Patented Dec. 8, 1914.
2 SHEETS—SHEET 1.
Fig. 1
Fig. 2
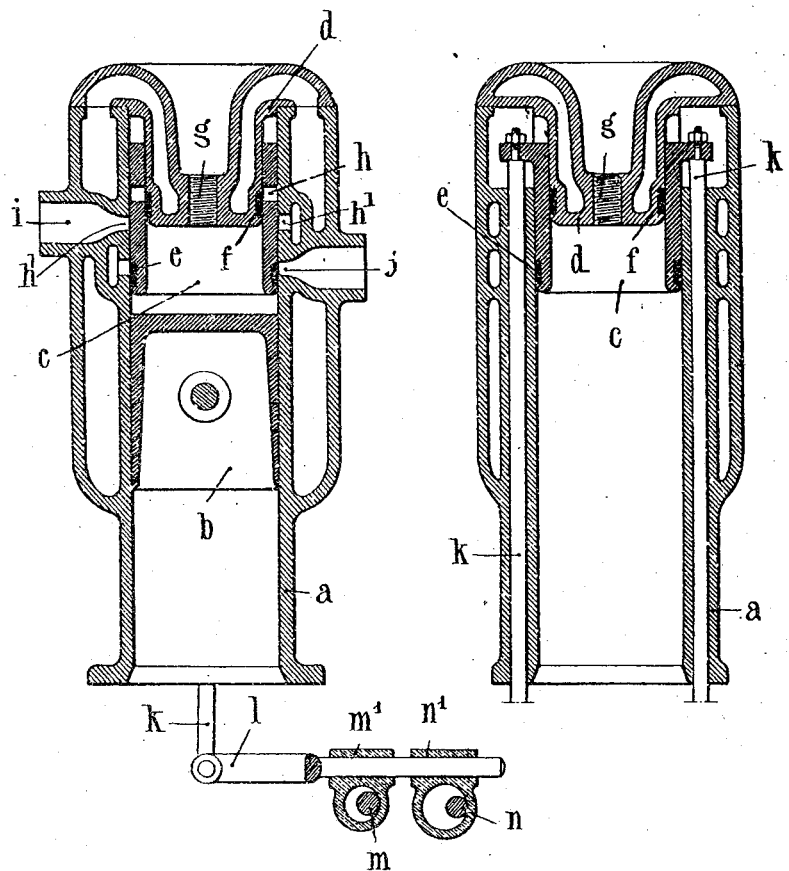
Fig. 3
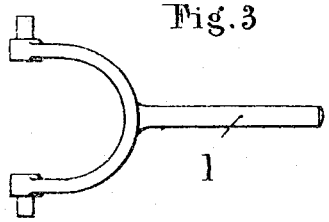
Witnesses
C. N. Walter
A. Morrell
Inventor
Antoine Jean Baptiste Jaubert.
by P. H. Hudda
Attorney.

A. J. B. JAUBERT.
VALVE MECHANISM FOR EXPLOSION MOTORS.
APPLICATION FILED AUG. 16, 1912.

1,120,149.

Patented Dec. 8, 1914.

UNITED STATES PATENT OFFICE.

ANTOINE JEAN BAPTISTE JAUBERT, OF SIMIANE, FRANCE.

VALVE MECHANISM FOR EXPLOSION-MOTORS.

1,120,149. Specification of Letters Patent. Patented Dec. 8, 1914.

Application filed August 16, 1912. Serial No. 715,384.

*To all whom it may concern:*

Be it known that I, ANTOINE JEAN BAPTISTE JAUBERT, a citizen of the French Republic, residing at Simiane, Basses-Alpes, in France, have invented a certain new and useful Improvement in Valve Mechanism for Explosion-Motors, of which the following is a specification.

This invention relates to valve mechanism for explosion motors for effecting the distribution of the motive fluid in explosion motors without any mechanical shock and with a rapid opening and closing of the admission and exhaust ports so as to diminish as much as possible restriction of the passage of the gas.

The mechanism allows the provision of a cylindrical explosion chamber without lateral recesses or openings the walls being absolutely smooth at the moment of the explosion the ports being then all covered.

The improved mechanism comprises an annular valve member arranged in the motor cylinder above the piston without contact with the latter and sliding between the water jacketed cylinder and a water jacketed plug so as to uncover at the required times the admission and exhaust ports.

The arrangement of the valve member between water jackets, cooling it interiorly and exteriorly provides means for maintaining it at a sufficiently low temperature to assure its proper function.

The annexed drawing illustrates three examples of construction of the invention.

Figure 4:
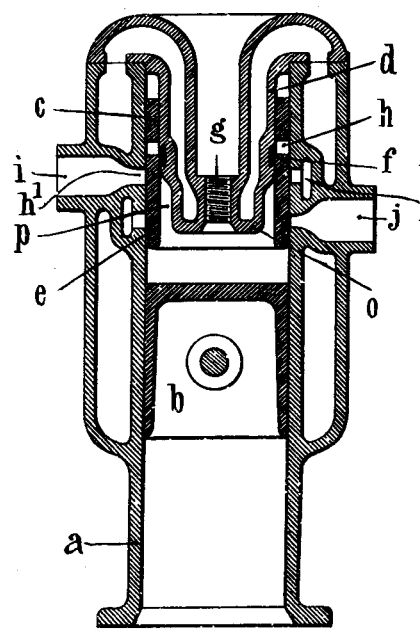
Figure 5:
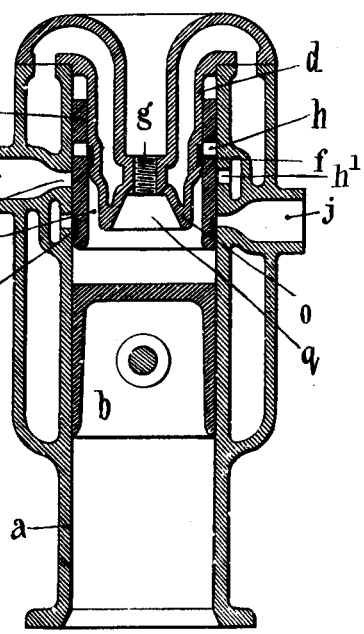

Figures 1 and 2 are vertical sections of a motor provided with the valve mechanism. Fig. 3 illustrates a detail of construction. Figs. 4 and 5 are vertical sections illustrating two modifications of shape of the water jacketed plug of the cylinder.

$a$ is the cylinder, $b$ the motor piston, $c$ the annular valve member sliding between the water jacketed cylinder $a$ and water jacketed plug $d$ shaped like a fixed piston. The valve is provided at $e$ with one or more packing rings to assure gas tightness in the cylinder. The plug $d$ is also provided with packing rings at $f$. The sparking plug is inserted at $g$. The admission is made by an annular series of ports $h$ formed in the valve member, which when the latter descends form communication between the cylinder and the conduit $i$ the ports $h$ moving below the lower edge or a shoulder of $d$. In Figs. 1 and 2 the ports are shown in the positions they occupy at the moment of explosion. The exhaust takes place through the ports $j$ which the lower edge of the valve uncovers in ascending. It can be seen that at the moment of explosion the orifices of the valve are covered and that the wall of the explosion chamber is absolutely smooth.

The valve operates in the following manner: During the descent of the piston at the periods of admission the valve descends and its ports $h$ coincide with similar orifices $h^1$, made in the wall of the cylinder at the level of the conduit $i$. The valve then ascends and is maintained during compression and expansion at about the position shown in Fig. 1 then at the time of exhaust continues to rise to uncover the orifices $j$. At the end of the exhaust it rapidly descends to obturate the ports $j$ and uncover the admission ports. It is necessary therefore that the rising movement of the valve be interrupted at the middle of the stroke by a period of rest and that its descending stroke should on the contrary be as rapid as possible. Further the valve must return to its point of departure after two complete rotations of the motor the latter being of four stroke cycle. The suitable movement is communicated to the valve by means of rods $k$ Fig. 2 appertaining to any number guided parallel to the axis of the cylinder the said rods extending into the crank chamber, where the governing mechanism, which may be of any suitable kind is arranged. The movement of the valve is in the example shown effected by means of a balance beam $l$ in the form of a fork actuated by two eccentrics $m$, $n$ of which the one turns at half the speed and the other at the speed of the motor. The eccentrics $m$, $n$ act on guide blocks $m^1$, $n^1$ which slide on the rod of the fork $l$ shown in plan in Fig. 3. This arrangement has the advantage of displacing the points of oscillation of the fork $l$ to increase the speed of descent of the valve. Further it allows of equally distributing the force to the two ends of the arms of the fork, the latter acting like a swing bar. As can be seen from the drawing the valve member $c$ slides between cooling surfaces formed by the circulation of cooling water in the cylinder jacket and by the water circulation in the plug $d$ so that the valve member is maintained sufficiently cool for its proper function. In order to obtain a greater cooling effect the plug $d$ can be extended into the cylinder by a part *o* of restricted diameter acting as a deflector and forming an annular space *p*, through which the fresh gases introduced at *i* pass while licking the lower part of the valve member *c* in passing into the cylinder. Further during the explosion the annular space *p* contains a thin gaseous layer which being immediately cooled by the walls shields the valve from too direct contact of the exploded gas. As shown in Fig. 5 the extension at the base of the plug may be hollowed as at *q*.

What I claim as my invention and desire to secure by Letters Patent of the United States is:—

Distribution mechanism for explosion motors comprising in combination a motor cylinder having an annular series of inlet ports and an annular series of outlet ports, a plug of smaller diameter than the interior of said cylinder extending into the one end thereof, a piston working in said cylinder, a cylindrical valve member of the same diameter as the piston, reciprocatable in the cylinder above said piston and between the inner wall of the cylinder and the outer wall of said plug, said valve member having an annular series of ports in its wall, adapted to communicate with said inlet ports of the cylinder and allowing the entrance of the motive fluid on passing the lower edge of said plug. When the valve member descends the said outlet ports in the cylinder being unmasked by the lower edge of said valve member when it rises, two lugs arranged symmetrically opposite one another at the upper end of said valve member, means connected to said lugs for imparting reciprocating movement to said valve member, a packing ring mounted in the outer wall of said valve member, adjacent the lower edge thereof, providing a gas tight joint between the valve and the cylinder, and a packing ring arranged in the outer face of the plug adjacent the lower edge thereof providing a gas tight joint between the valve and the plug.

In witness whereof I have signed this specification in the presence of two witnesses.

ANTOINE JEAN BAPTISTE JAUBERT.

Witnesses:
M. LABANY,
V. OTTON.